United States Patent [19]

Kinsman

[11] 4,137,627

[45] Feb. 6, 1979

[54] METHOD OF MAKING FLAT BATTERIES

[75] Inventor: Gordon F. Kinsman, Billerica, Mass.

[73] Assignee: Polaroid Corporation, Cambridge, Mass.

[21] Appl. No.: 852,916

[22] Filed: Nov. 18, 1977

Related U.S. Application Data

[63] Continuation-in-part of Ser. No. 761,652, Jan. 24, 1977, abandoned.

[51] Int. Cl.² .................... H01M 6/00; H01M 6/46
[52] U.S. Cl. ............................. 29/623.4; 29/423; 141/1.1; 429/152; 429/162; 29/623.2
[58] Field of Search ............... 29/623.1, 623.2, 623.3, 29/623.4, 423, 424; 429/152, 153, 154, 155, 162; 141/1.1, 33

[56] References Cited

U.S. PATENT DOCUMENTS

| | | | |
|---|---|---|---|
| 3,488,220 | 1/1970 | Lyall et al. | 429/623.4 |
| 3,563,805 | 2/1971 | Deierhoi, Jr. | 429/152 |
| 3,607,430 | 9/1971 | Glover | 29/623.3 |
| 3,877,045 | 4/1975 | Bloom et al. | 429/162 |
| 3,899,355 | 8/1975 | Chiklis | 429/153 |

Primary Examiner—C. W. Lanham
Assistant Examiner—Daniel C. Crane
Attorney, Agent, or Firm—John W. Ericson

[57] ABSTRACT

A frame and separator assembly for the manufacture of thin, flat laminar batteries in which the frame has adhesive surfaces to which a separator is adhered. The method of making batteries in which these assemblies are placed over electrode slurries extruded onto conductive plastic substrates and the separators are coated with electrolyte and then contacted with dry patch anodes on conductive plastic substrates to form cells.

11 Claims, 8 Drawing Figures

METHOD OF MAKING FLAT BATTERIES

This application is a continuation in part of my copending U.S. application for Letters Patent Ser. No. 761,652, filed on Jan. 24, 1977 for Flat Batteries And Methods of Making The Same, and assigned to the assignee of this application, now abandoned.

This invention relates to primary batteries, and particularly to novel methods and apparatus for constructing thin, flat cells and batteries.

Copending U.S. application for Letters Patent Ser. No. 684,370 was filed on May 7, 1976 by Edwin H. Land for Electrical Cells and Batteries, and is assigned to the assignee of this application, now abandoned. In application Ser. No. 684,370, Leclanche cells are described which include wet slurry cathodes, cellophane separators, and dry patch anodes wet with gel electrolyte. The objects of this invention are to facilitate the construction of thin, flat laminar batteries of the kind described in application Ser. No. 684,370, while effecting improvements in the shelf life and current drain capability of laminar batteries.

Briefly, the above and other objects of the invention are attained by novel methods and apparatus centered about solutions of a problem commonly encountered in the manufacture of thin, flat laminar batteries designed for use without external stress applying members, and to the particular problems involved in the use of cellophane separators in Leclanche cells. The general problem is a tendency to delaminate during storage or use, with the accumulation of thin, gassy layers in the electrically active regions that seriously decrease the available electrical capacity of the battery and increase internal impedance, particularly for high current drain applications where the load impedance is low. The problems specifically encountered with cellophane separators are that the material is not easily bonded to other materials, and that it swells in contact with the battery electrolyte in a manner destructive to any bond that can be formed. Selective wetting of portions of a cellophane separator will cause disruptive wrinkling or curling, as will drying out after wetting.

As more fully described in my copending U.S. application Ser. No. 809,976, filed on June 27, 1977, now U.S. Pat. No. 4,098,965, for Flat Batteries and Method of Making the Same as a division of the above-cited application Ser. No. 751,652, it has been found that the marginal depression ordinarily produced about the periphery of a laminar battery during sealing causes an oil-canning effect through the stresses induced by permanently deforming the external metal terminal of the battery, usually steel or aluminum. Gases, usually air, that are included in the void regions of the battery during assembly apparently tend to move toward the central electrode regions in the relief of these stresses. In accordance with a preferred practice, this problem is addressed by the use of battery frames considerably thicker than those commonly employed. For example, in one commercial practice, four cell batteries of a nominal overall thickness of 80 to 100 mils have been made with four frames formed by impregnating the edges of the separators with hot melt adhesive, each frame being about 11 mils in thickness. In accordance with the invention, for this application, frames from 15 to 20 mils in thickness would be preferred. For use with the thick slurry cathode batteries to be described below, even thicker frames, from 18 to 25 mils in thickness, are preferred. These thick peripheral frames greatly reduce the deformation of the end cell metal terminal, and resulting oil canning effect, produced during sealing as described above.

The material for the frames in accordance with the invention should be chosen for its ability to bond weakly to the cellophane separators. In accordance with the invention, the cellophane separators are heat-tacked to the frames and the combination is handled as a subassembly during the manufacture of batteries by the process to be described. After assembly, swelling of the separators destroys the temporary bond to the frames entirely, so that uniform wetting and swelling of the separators takes place. Too good a bond, as might be produced by various conventional cements or thermosetting resins, is definitely undesirable because of the differential swelling that would be produced.

The manner in which it is preferred to practice the invention in the manufacture of thin, flat laminar batteries will best be understood in the light of the following detailed description, together with the accompanying drawings, of preferred embodiments thereof.

Figure 1:
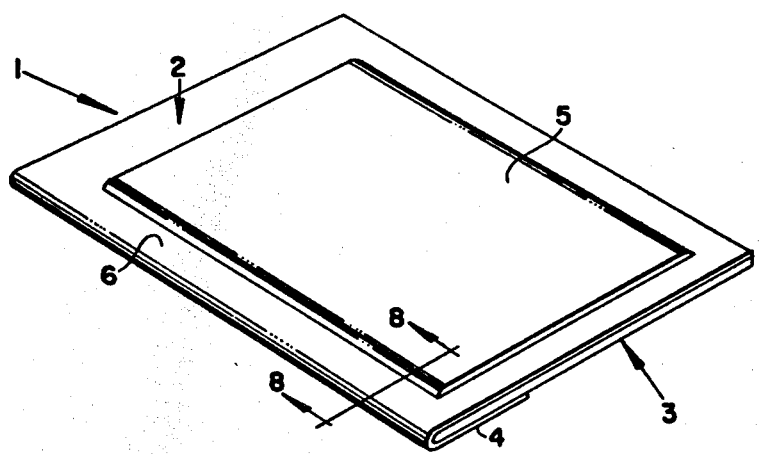
FIG. 1 is a schematic perspective three-quarter sketch of a battery in accordance with the invention, prior to final packaging.

As shown in FIG. 1, a thin, flat battery 1 comprises an outer anode terminal plate 2, of tinned steel, aluminum, or the like, bonded to other components of the battery generally designated 3, and to be described in more detail below, and folded over as indicated at 4 to form a negative terminal in generally the same plane as a positive terminal formed in a manner to be described below.

As indicated, the battery is characterized by a generally raised central region 5 surrounded by a slightly depressed marginal portion 6 effected during the heat sealing of the battery in a manner to be described. In accordance with the invention, the difference in thickness is kept as small as possible, by expedients to be described.

Figure 2:
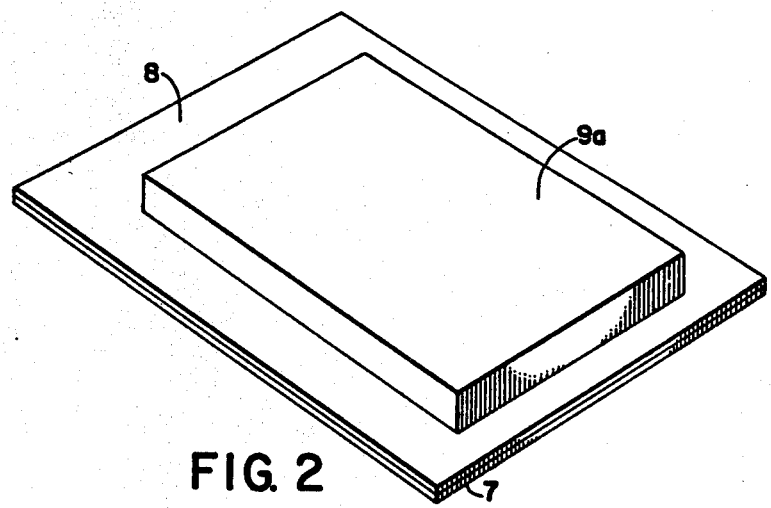
FIG. 2 is a schematic perspective three-quarter view of a cathode current collector and terminal on which there is deposited a layer of cathode mix in an early stage of the assembly of a battery in accordance with the invention.

FIG. 2 shows the end cathode and positive terminal of the battery 1 of FIG. 1 in an early stage of manufacture. Vertical dimensions have been greatly exaggerated with respect to horizontal dimensions to illustrate the relative thicknesses of the internal components of the battery in relatively close proportion to those preferably employed. The negative terminal comprises an outer metal layer 7, of tinned steel, aluminum, or the like, identical in thickness to the negative terminal 2. While various thicknesses may be employed, in practice it is preferred to use sheet metal about 2 mils in thickness where tinned steel is the chosen metal.

Bonded to the metal positive terminal 7 is a sheet of carbon-filled thermoplastic material 8. In the presently preferred practice of the invention, the sheet 8 is made of an electrically conductive carbon-impregnated vinyl film sold by Pervel Industries under the trademark "Condulon," having a thickness on the order of about 2 mils, and including approximately 34 percent of carbon by weight. The carbonaceous layer 8 serves as a current collector and is characterized by being electrochemically inert in the Leclanche cell environment and being essentially impervious to liquid electrolyte.

Deposited within the boundaries of the current collector 8 is a layer of cathode mix 9a containing manganese dioxide, carbon, ammonium chloride, zinc chloride and water in proportions to be discussed below. This layer and other such layers to be described can be deposited on the substrate by silk screening, by extrusion, or by other conventional coating processes. In mass production manufacture, extrusion is preferred. For ease in adapting to a particular extrusion operation, small amounts of binders or dispersants may be added. However, preferably no such binders or dispersants are added to the cathode mix as such additives tend to degrade the electrical performance of the finished battery at least to some extent. The extremely wet cathode mixes without binders or dispersants which are preferred have exhibited a surprising ability to adhere to the adjacent layers of the battery and to be substantially cohesive.

It is preferred to exclude mercuric chloride from the cathode mix. An adequate amount of mercuric chloride to provide amalgamation of the anode is advantageously included in the gel electrolyte layer on the anode side.

Figure 3:
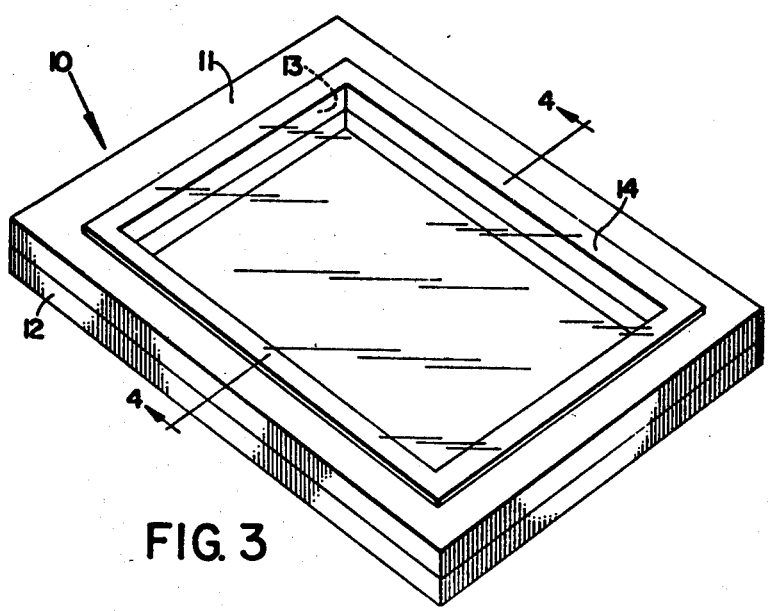
FIG. 3 is a schematic perspective three-quarter view of a separator and frame construction used in batteries in accordance with the invention.

FIG. 3 shows a separator and frame construction adapted to cooperate with the cathode of FIG. 2 in constructing a cell in accordance with the invention. The frame is shown at 10 and may comprise a thin, flat loop made of any suitable liquid impervious insulating material that can be lightly bonded to cellophane. It may be made of a single or double thickness, preferably from 18 to 25 mils in total thickness with the cathode thicknesses to be described. One suitable material for this purpose is Versalon 1140 hot melt adhesive, a polyamide resin made and sold by General Mills, Inc., of Minneapolis, Minnesota. In another construction used successfully, the frame was made of a fibrous nonwoven material, such as that conventionally employed in primary battery separators, filled with Versalon TPX 980, a thermoplastic polyamide resin made and sold by General Mills, Inc., of Minneapolis, Minnesota. In accordance with the invention in one practical embodiment, two frame elements 11 and 12 each 10 mils in thickness were heat sealed together to form the frame for each cell.

As indicated, a rectangular opening 13 is formed in the frame 10 comprising elements 11 and 12, and over this opening is laid a separator membrane 14, preferably of regenerated cellulose such as PUD-O cellophane as manufactured and sold by E. I. DuPont de Nemours & Co. of Wilmington, Delaware. It is necessary that the cellophane be free of plasticizers and humectants, particularly glycerine or the like, which would destroy it for its intended purpose in the Leclanche cell electrolyte environment. It is also highly desirable that the membrane 12 be quite thin, for example, from 1 to 2 mils in thickness, and in the presently preferred embodiment, 1.34 mils in thickness.

The cellophane separator 14 shown in FIG. 3 is preferably bonded to the frame 10 prior to assembly with the other components. A useful temporary bond for this purpose can be effected between the cellophane 12 and the polyamide surface of the frame element 11 by application of moderate heat under light pressure. After assembly of the battery in the manner described, this bond apparently is destroyed, but it is a useful aid in assembly in the manner to be described.

Four of the frames 10 and separators 14 are required for the manufacture of a four cell battery. These will be designated by the suffixes a, b, c and d in the description to follow.

Figure 4:
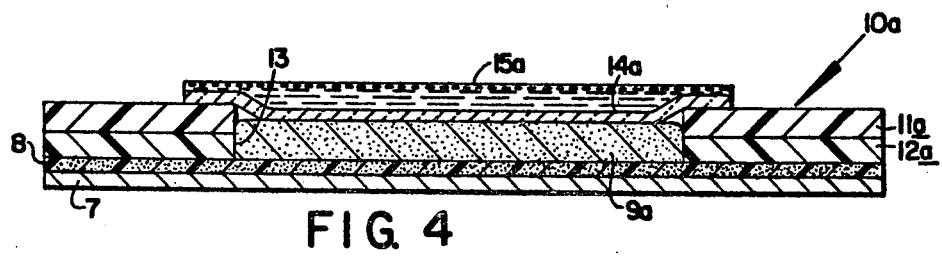
FIG. 4 is a schematic elevational cross-sectional sketch, taken substantially along lines such as 4—4 in FIG. 3, of a portion of a battery in initial stages of manufacture incorporating the structures of FIGS. 2 and 3 with an added layer of electrolyte.

After the extrusion of the cathode slurry layer 9a on the current collector 8 as described above, the first frame 10a with its separator 14a is put in place over the current collector 8 with the slurry layer 9a received in the opening 13 and with the separator 14a in contact with the cathode slurry 9a. A layer of gel electrolyte, of a composition to be described, is then extruded over the separator 14a as shown in FIG. 4. The thickness of the cathode slurry layer may be 10 to 20 mils. As noted, the separator is preferably 1.34 mils initially; this will approximately double as the cellophane swells in the electrolyte solution from the cathode slurry and from the gel electrolyte layer 15a. The gel layer 15a may initially be about 5.4 mils in thickness. The actual dimensional relationships are difficult to illustrate because the horizontal dimensions are so large relative to the vertical dimensions, and because small surface effects are significant on the scale of the vertical dimensions. The basic point is that the thickness of the frames is preferably chosen approximately equal to the combined thicknesses of the components in the central region of the battery so that the overall thickness of the battery will be nearly the same at the edges as in the center.

In the practice of the invention as just described, the frame 10a and separator 14a are placed down over the cathode slurry with the separator side away from the current collector 8, as shown in FIG. 4. However, batteries have been made successfully with the separator side adjacent the current collector, so that the edges of the separator 14a are in contact with the current collector 8. Even with the relatively thick frames preferred, the parts are still thin enough to permit this alternative form of assembly where desired.

Figure 5:
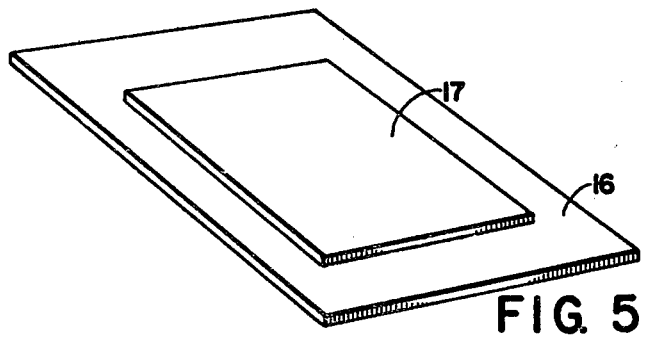
FIG. 5 is a schematic perspective sketch of an anode and intercell connector comprising a component of a battery in accordance with the invention.

FIG. 5 shows a combined anode and intercell connector subassembly, one of which is the component next to be added to the assembly of FIG. 4. This subassembly comprises a sheet 16 of conductive plastic that may be of the same material and thickness as the cathode collector sheet 8 described above. On the intercell connector sheet 16 is deposited, preferably by extrusion, a zinc anode patch 17 of a composition to be described below. The anode patch 17 includes binders and is dried before it is installed in the battery. Three of these subassemblies, identified by suffixes a, b and c below, are employed in the four cell batteries to be described.

Figure 6:
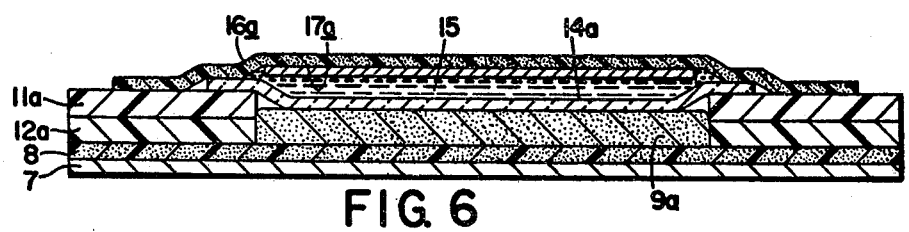
FIG. 6 is a schematic elevational sketch similar to FIG. 4 and showing a partially completed battery in a later stage of manufacture.

As shown in FIG. 6, a first of the subassemblies of FIG. 5, comprising an intercell connector 16a and an anode patch 17a, is put in place over the frame element 11a with the anode 17a in contact with the gel electrolyte layer 15a. The intercell connector 16a preferably extends well beyond the boundaries of the wet separator 14a to allow a later thermal bond to be effected between the intercell connector 16a and adjacent frame elements, but within the boundaries of the frames to prevent intercell short circuits.

Figure 7:
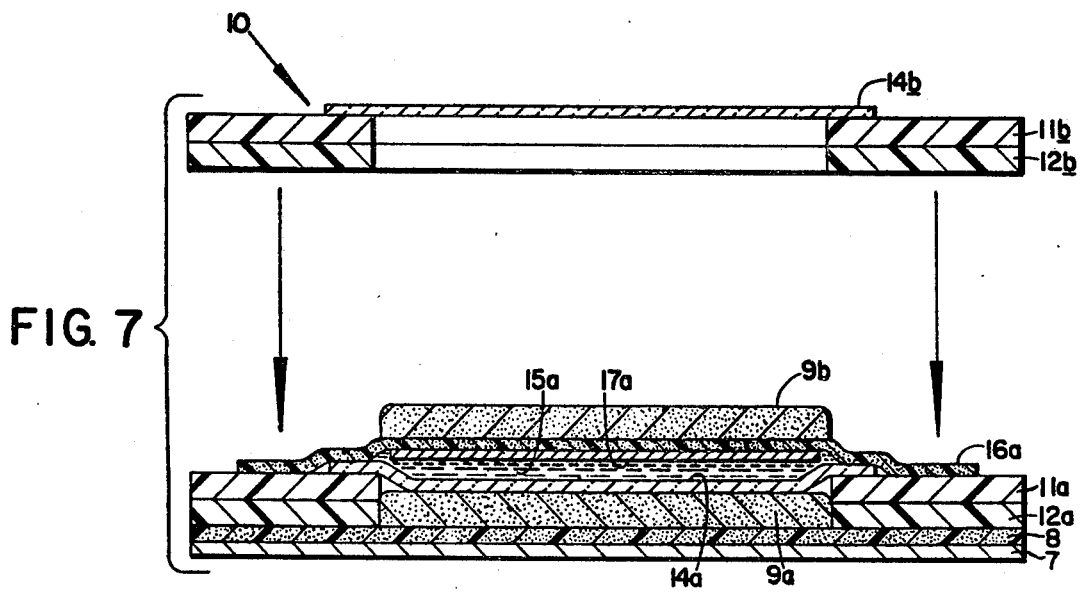
FIG. 7 is an exploded schematic cross-sectional elevational sketch similar to FIGS. 4 and 7 illustrating a partially assembled battery in the process of receiving a framed separator in accordance with the invention.

The next steps in the assembly of the battery are the extrusion of a second cathode slurry layer 9b over the intercell connector 16a, followed by the placement of the second frame 10b with its pre-attached separator 14b as suggested in FIG. 7. Thereafter, the separator 14b is coated with gel electrolyte and another intercell connector and anode subassembly is added. The process is continued in this fashion until a fourth cathode slurry 9d has been extruded over the third intercell connector 16c. The result, after completion in a manner to be described, is as illustrated in FIG. 8.

As in the case of the assembly of FIG. 4 made as described above, the frame 10 in FIG. 7 may be inverted and placed down over the slurry 9b with the separator 14b on the side facing the slurry if so desired. The following layer of gel electrolyte would then be extruded into the opening in the frame 10 over the separator. In either procedure, the result desired is that the active components be in registry with each other and with the openings in the frames.

Figure 8:
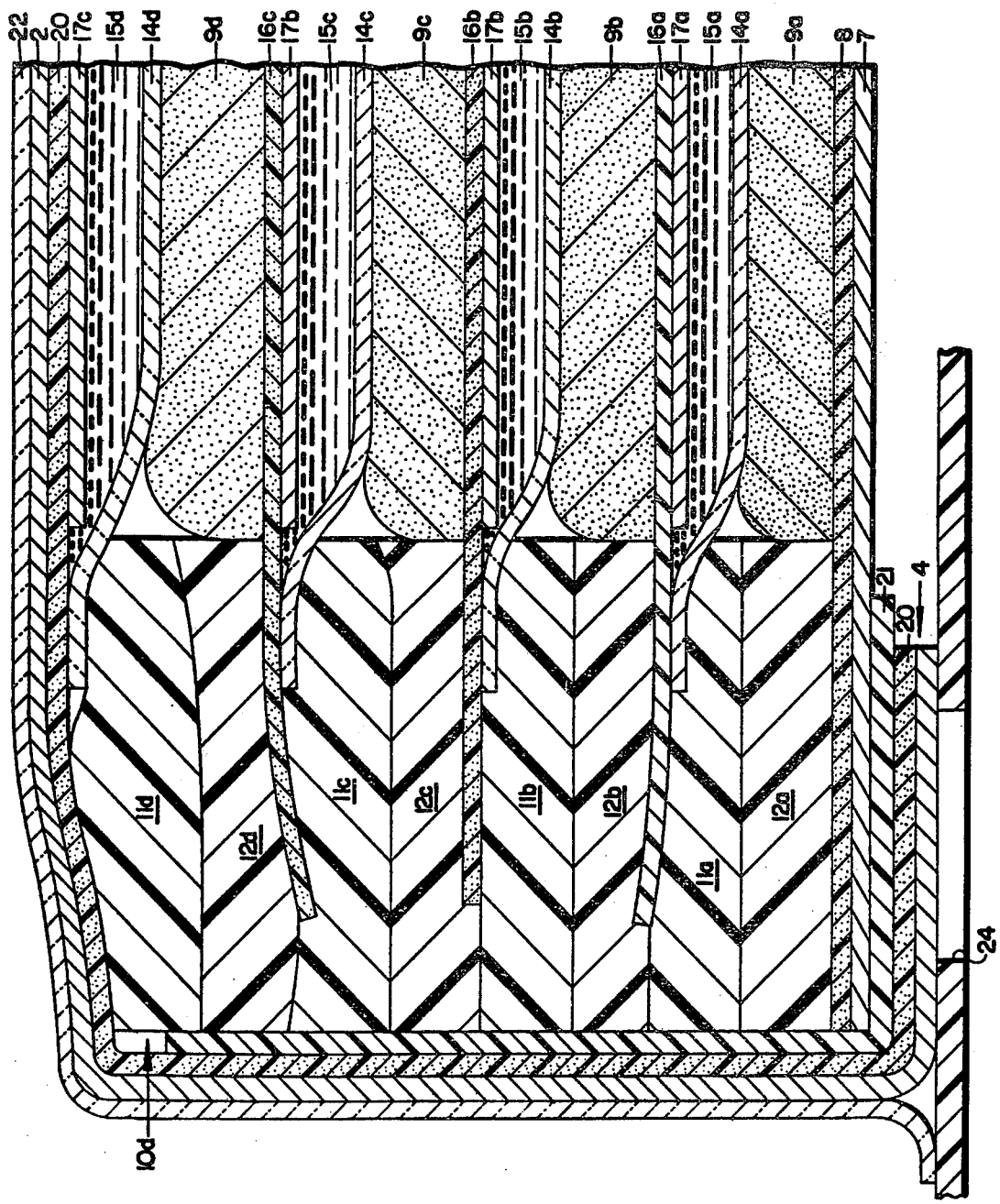
FIG. 8 is a fragmentary schematic cross-section elevational sketch, on an enlarged scale, of a portion of a completed battery as seen essentially along the lines 8—8 in FIG. 1.

Referring to FIG. 8, there is shown a completed battery of the type shown in FIG. 1, including an external semi-permeable wrapper and a cardboard base as utilized in commercial practice.

After the last of the anode slurry layers 9d is extruded over the third intercell connector 16c, the uppermost frame 10d, comprising the heat-sealed elements 11d and 12b, with the pre-attached separator 14d, is put in position. An anode terminal assembly is next put in place.

Referring to FIG. 8, the anode terminal assembly comprises the steel or aluminum terminal sheet 2 described above. To this terminal sheet is prelaminated a conductive plastic anode collector sheet 20, which may be 2 mils in thickness and of the same material as the cathode collector 8 and the intercell connector 16. An anode patch 17c is formed on the collector 20 in the manner described above, of the same size, weight and composition as the other anode patches 17 described above.

After coating the separator 14d with a layer of gel electrolyte 15d, the anode terminal assembly just described, initially in flat form, is placed over the frame 11d with the anode patch 17d in contact with the gel electrolyte 15d. The assembly is then sealed with heat and pressure, preferably in the manner described in copending U.S. application For Letters Patent Ser. No. 761,650, filed Jan. 24, 1977 by Gordon F. Kinsman for Method for Sealing Battery and assigned to the assignee of this application, now U.S. Pat. No. 4,065,578. As more fully described therein, the battery frames and projecting regions of the intercell connectors are preferably heat sealed together under a pressure that is at least as great, or greater, in the center of the battery as at the edges, so that peripheral reductions in thickness are minimized. The use of thick frames for the purposes and in the manner herein described contributes materially to the ease of avoiding deformation of the end steel 2 during sealing in this manner.

After the battery has been sealed in the manner just described, an insulating sheet 21 of, for example, 2 mil polyethylene, is inserted between the steel cathode terminal 7 and the carbon-filled plastic anode current collector 20 to insulate the cathode terminal from the anode terminal, and the end portion of the anode terminal assembly 4 is folded around to make the negative terminal assembly in substantially the same plane as the positive terminal. Next, a liquid impervious, gas permeable outer covering 22, of polyethylene, polyvinyl chloride, or the like, for example, about 1 mil in thickness, is wrapped over the battery so assembled and adhered by any suitable bonding mechanism to a cardboard base plate 23. Apertures such as 24 through the cardboard base plate 23 serve to admit contacts to the terminals such as 4 of the battery for connection to external apparatus.

Batteries in accordance with the preferred embodiment were made as described in the following example.

EXAMPLE I

A cathode mix was made with the following composition, in which quantities are given both in weight percent, based on the total weight of materials, and in grams.

|  | Wt. % | Grams |
|---|---|---|
| $MnO_2$ | 51.81 | 200 |
| Shawinigan Black | 6.48 | 25 |
| $H_2O$ | 27.80 | 107.3 |
| $NH_4Cl$ | 9.56 | 36.9 |
| $ZnCl_2$ | 4.35 | 16.8 |

The Shawinigan Black is a highly structured carbon black in the "100% compressed" form, as made and sold by Shawinigan Products Corp., N.Y., N.Y. The ammonium chloride and zinc chloride were dissolved in the water. The manganese dioxide and carbon were blended together, then mixed into 141 grams of the electrolyte solution and stirred until thoroughly dispersed. The balance, 20 grams, of the electrolyte was added as convenient to temporarily reduce the viscosity of the mix, and thereby assist in blending, as maximum viscosity was approached. Blending was continued until a homogeneous, highly viscous and cohesive mass was obtained.

The cathode mix made as just described was coated on 2 mil Condulon sheets 2.75 inches by 3.42 inches to a depth of 25 mils, over a central area about 2½ inches by 1⅞ inches; the weight of mix per cathode was 3.5–4.0 grams.

The anode patches were made from the following composition, in which composition is expressed in parts by weight, in accordance with the presently preferred practice of the invention;

| Zinc powder | 1,000 |
|---|---|
| $H_2O$ | 149.2 |
| Benton LT Dispersant | .61 |
| Tetrasodium pyrophosphate | 125 |
| Shawinigan Black | 5 |
| Polytex 6510 Latex | 39.05 |

In the above composition, Polytex 6510 is an acrylic emulsion resin made and sold by Celanese Corp., of Newark, New Jersey. Benton LT is an organic derivative of hydrous magnesium aluminum silicate, as made and sold by National Lead Co., Inc. of N.Y., N.Y.

The composition was laid down on the carbonaceous sheet in the manner described above, and then heated to dryness to form a dry patch of an area about 2½ by 1⅞ inches and from 1½ to 2 mils in thickness. On the inter-cell connectors this operation was performed before the cathode mix was deposited.

The gel electrolyte employed in the batteries to be described had the following composition, expressed as parts by weight:

| | |
|---|---|
| $NH_4Cl$ | 21.8 |
| $ZnCl_2$ | 9.9 |
| $HgCl_2$ | 1.9 |
| $H_2O$ | 63.5 |
| Natrosol 250 HHR | 2.9 |

Natrosol 250 HHR is hydroxyethyl cellulose, sold by Hercules, Inc. of Wilmington, Delaware.

This composition was coated over the cellophane separator to a thickness of 5.4 mils.

Five four-cell batteries, identified as IA through IE below, were made as described above. Open circuit voltages (OCV), and closed circuit voltages (CCV) measured with a 3.3 ohm load for 0.1 seconds, were determined after 4 days and are given below:

| Battery | OCV | CCV |
|---|---|---|
| IA | 6.77 | 6.28 |
| IB | 6.74 | 6.23 |
| IC | 6.76 | 6.27 |
| ID | 6.79 | 6.31 |
| IE | 6.79 | 6.33 |
| Average | 6.77 | 6.28 |

Batteries made in accordance with the preferred embodiment of the invention except that various binders or dispersants are included exhibit many of the advantages of the invention, but are less effective under conditions of high current drain, as for the rapid recharge of an electronic flash unit. Illustrative of such batteries are those described in Examples II and III below.

EXAMPLE II

Six four-cell batteries were made exactly as described in Example I, above, except that 2.9 percent by weight of BP-100, a latex made and sold by Exxon Chemical Co. of Houston, Tex., was included in the cathode mix. These batteries, identified below as IIA through IIF, were measured in the manner described above after 4 days, with the following results.

| Battery | OCV | CCV |
|---|---|---|
| IIA | 6.63 | 6.07 |
| IIB | 6.63 | 6.06 |
| IIC | 6.72 | 6.09 |
| IID | 6.68 | 6.08 |
| IIE | 6.69 | 6.06 |
| IIF | 6.58 | 5.93 |
| Average | 6.66 | 6.05 |

EXAMPLE III

Five four-cell batteries were made exactly as described in Example I, above, except that 1.52 percent by weight of poly(2-acrylamido-2-methylpropane sulfonic acid) was included in the cathode mix. These batteries, identified below as IIIA through IIIE, were measured in the manner described above after 4 days, with the following results:

| Battery | OCV | CCV |
|---|---|---|
| IIIA | 6.72 | 5.67 |
| IIIB | 6.69 | 5.67 |
| IIIC | 6.68 | 5.73 |
| IIID | 6.70 | 5.69 |
| IIIE | 6.68 | 5.57 |
| Average | 6.69 | 5.67 |

While the invention has been described with respect to the details of various illustrative embodiments, many changes and variations will be apparent to those skilled in the art upon reading this description, and such can be made without departing from the scope of the invention.

Having thus described the invention, what is claimed is:

1. In the method of manufacturing a thin, flat laminar battery, the steps of forming a first thin, dry patch anode layer over a central region of the surface of a first sheet of liquid impervious conductive plastic material, extruding a layer of wet slurry cathode material over a surface of said sheet opposite said dry patch anode, temporarily heat sealing a cellophane separator to one surface of a liquid impervious thermoplastic frame over an opening formed in said frame adapted to receive said cathode slurry layer, placing the side of said frame opposite said separator in contact with said first sheet with said cathode slurry in said opening, coating the exposed surface of said separator with gel electrolyte, forming a second thin, dry patch anode layer over a central region of the surface of a second sheet of liquid impervious conductive plastic material congruent with said first sheet, and placing said second sheet over said frame with said second anode patch in registry and in contact with said gel electrolyte.

2. In a method of making a thin, flat laminar battery, the steps of extruding a first wet slurry cathode layer over a region of the surface within the periphery of a liquid impervious conductive plastic sheet, heat sealing a cellophane separator over a central opening formed in a frame of liquid impervious insulating material at least the exterior surface of which comprises a thermoplastic hot melt adhesive material, placing said frame over said sheet with said first cathode slurry in the opening in said frame with said separator thereon exposed, coating said separator with a layer of gel electrolyte, forming a dry patch anode layer over a central region of the surface of a sheet of liquid impervious conductive plastic material, and placing said sheet over said frame with the anode layer thereon in contact with the gel electrolyte on said separator.

3. In the method of manufacturing a thin, flat laminar battery, the steps of forming a first electrode layer over a central region of the surface of a first sheet of liquid impervious conductive plastic material, extruding a layer of wet slurry electrode material over a surface of said sheet opposite said first electrode, temporarily heat sealing a separator to one surface of a liquid impervious thermoplastic frame over an opening formed in said frame adapted to receive said slurry electrode, placing the side of said frame opposite said separator in contact with said first sheet with said wet slurry electrode in said opening, coating the exposed surface of said separator with electrolyte, forming a third electrode layer of the same composition as said first electrode layer over a central region of the surface of a second sheet of liquid impervious conductive plastic material congruent with said first sheet, and placing said second sheet over said frame with said third electrode layer in registry and in contact with said electrolyte.

4. In a method of making a thin, flat laminar battery, the steps of extruding a first wet slurry cathode layer over a region of the surface within the periphery of a first liquid impervious conductive plastic sheet, sealing a separator over a central opening formed in a frame of liquid impervious insulating material at least the exterior surface of which comprises a thermoplastic hot melt adhesive material, placing said frame over said sheet with said first cathode slurry in the opening in said frame with said separator thereon exposed, coating said separator with a layer of electrolyte, forming an anode layer over a central region of the surface of a second sheet of liquid impervious conductive plastic material, and placing said second sheet over said frame with the anode layer thereon in contact with the electrolyte on said separator.

5. In the method of manufacturing a thin, flat laminar battery, the steps of forming a first thin, dry patch anode layer over a central region of the surface of a first sheet of liquid impervious conductive plastic material, extruding a layer of wet slurry cathode material over a surface of said sheet opposite said dry patch anode, temporarily heat sealing a cellophane separator to one surface of a liquid impervious thermoplastic frame over an opening formed in said frame adapted to receive said cathode slurry layer, placing said frame in contact with said first sheet with said cathode slurry in registry with said opening and in contact with said separator, coating the exposed surface of said separator with gel electrolyte, forming a second thin, dry patch anode layer over a central region of the surface of a second sheet of liquid impervious conductive plastic material congruent with said first sheet, and placing said second sheet over said frame with said second anode patch in registry and in contact with said gel electrolyte.

6. In a method of making a thin, flat laminar battery, the steps of extruding a first wet slurry cathode layer over a region of the surface within the periphery of a liquid impervious conductive plastic sheet, heat sealing a cellophane separator over a central opening formed in a frame of liquid impervious insulating material at least the exterior surface of which comprises a thermoplastic hot melt adhesive material, placing said frame over said sheet with said first cathode slurry in registry with the opening in said frame and in contact with said separator, coating said separator with a layer of gel electrolyte, forming a dry patch anode layer over a central region of the surface of a sheet of liquid impervious conductive plastic material, and placing said sheet over said frame with the anode layer thereon in contact with the gel electrolyte on said separator.

7. In a method of making a thin, flat laminar battery, the steps of extruding a first wet slurry cathode layer over a region of the surface within the periphery of a first liquid impervious conductive plastic sheet, sealing a separator over a central opening formed in a frame of liquid impervious insulating material at least the exterior surface of which comprises a thermoplastic hot melt adhesive material, placing said frame over said sheet with said first cathode slurry in registry with the opening in said frame and in contact with said separator, coating said separator with a layer of electrolyte, forming an anode layer over a central region of the surface of a second sheet of liquid impervious conductive plastic material, and placing said second sheet over said frame with the anode layer thereon in contact with the electrolyte on said separator.

8. In the method of manufacturing a thin, flat laminar battery, the steps of extruding a layer of wet slurry cathode material over a central region of a first surface of a first sheet of liquid impervious conductive plastic material having a first thin, dry patch anode layer on a central region of a second surface of said sheet opposite said first surface, temporarily heat sealing a cellophane separator to one surface of a liquid impervious thermoplastic frame over an opening formed in said frame adapted to receive said cathode slurry layer, placing said frame in contact with said first sheet with said cathode slurry in registry with said opening and in contact with said separator, coating the exposed surface of said separator with gel electrolyte, placing a second sheet of liquid impervious conductive plastic material having a second thin, dry patch anode layer on a central region of its surface over said frame with said second anode patch in registry and in contact with said gel electrolyte.

9. In a method of making a thin, flat laminar battery, the steps of extruding a first wet slurry cathode layer over a region of the surface within the periphery of a liquid impervious conductive plastic sheet, heat sealing a cellophane separator over a central opening formed in a frame of liquid impervious insulating material at least the exterior surface of which comprises a thermoplastic hot melt adhesive material, placing said frame over said sheet with said first cathode slurry in registry with the opening in said frame and in contact with said separator, coating said separator with a layer of gel electrolyte, and placing a sheet of liquid impervious conductive plastic material having a dry patch anode layer on a central region of its surface over said frame with the anode layer thereon in contact with the gel electrolyte on said separator.

10. In a method of making a thin, flat laminar battery, the steps of extruding a first wet slurry cathode layer over a region of the surface within the periphery of a first liquid impervious conductive plastic sheet, sealing a separator over a central opening formed in a frame of liquid impervious insulating material at least the exterior surface of which comprises a thermoplastic hot melt adhesive material, placing said frame over said sheet with said first cathode slurry in registry with the opening in said frame and in contact with said separator, coating said separator with a layer of electrolyte, and placing a second sheet of liquid impervious conductive plastic material having an anode layer on a central region of its surface over said frame with the anode layer thereon in contact with the electrolyte on said separator.

11. In a method of making a thin, flat laminar battery, the steps of extruding a first wet slurry cathode layer over a region of the surface within the periphery of a liquid impervious conductive plastic sheet, placing a frame of liquid impervious insulating material at least the exterior surface of which comprises a thermoplastic hot melt adhesive material and having a cellophane separator temporarily bonded over said opening over said sheet with said first cathode slurry in registry with the opening in said frame and in contact with said separator, coating said separator with a layer of gel electrolyte, and placing a sheet of liquid impervious conductive plastic material having a dry patch anode layer on a central region of its surface over said frame with the anode layer thereon in contact with the gel electrolyte on said separator.

* * * * *